US007787637B2

(12) United States Patent
Kong

(10) Patent No.: US 7,787,637 B2
(45) Date of Patent: Aug. 31, 2010

(54) APPARATUS FOR IMPROVING IMAGE IN CAR AUDIO SYSTEM, AND CONTROL METHOD THEREOF

(75) Inventor: Byong Yong Kong, Icheon-shi (KR)

(73) Assignee: Hyundai Autonet Co., Ltd, Incheon-Si, Gyeonggi-Do (KR)

( * ) Notice: Subject to any disclaimer, the term of this patent is extended or adjusted under 35 U.S.C. 154(b) by 1228 days.

(21) Appl. No.: 11/164,055

(22) Filed: Nov. 8, 2005

(65) Prior Publication Data

US 2006/0147053 A1 Jul. 6, 2006

(30) Foreign Application Priority Data

Jan. 6, 2005 (KR) ...................... 10-2005-0001246

(51) Int. Cl.
*H04B 1/00* (2006.01)
*H04R 5/02* (2006.01)
*H04R 1/02* (2006.01)

(52) U.S. Cl. ......................... 381/86; 381/302; 381/389; 381/365

(58) Field of Classification Search ................... 381/86, 381/302, 389, 365, 339, 340, 341, 334, 61, 381/63
See application file for complete search history.

(56) References Cited

U.S. PATENT DOCUMENTS

| | | | | |
|---|---|---|---|---|
| 3,772,479 | A | 11/1973 | Hilbert | |
| 3,943,293 | A | 3/1976 | Bailey | |
| 3,989,897 | A | 11/1976 | Carver | |
| 4,349,698 | A | 9/1982 | Iwahara | |
| 4,356,349 | A | 10/1982 | Robinson | |
| 4,394,536 | A | 7/1983 | Shima et al. | |
| 4,836,329 | A * | 6/1989 | Klayman | 181/155 |
| 5,850,453 | A | 12/1998 | Klayman et al. | |
| 6,718,039 | B1 | 4/2004 | Klayman et al. | |
| 7,077,236 | B2 * | 7/2006 | Sleboda et al. | 181/150 |
| 2002/0081980 | A1 * | 6/2002 | Reus | 455/90 |
| 2002/0118858 | A1 * | 8/2002 | White et al. | 381/430 |
| 2003/0076964 | A1 * | 4/2003 | Stickles et al. | 381/86 |
| 2004/0247132 | A1 | 12/2004 | Klayman et al. | |

* cited by examiner

*Primary Examiner*—Vivian Chin
*Assistant Examiner*—Paul Kim
(74) *Attorney, Agent, or Firm*—IPLA P.A.; James E. Bame

(57) ABSTRACT

An apparatus for improving an image in a car audio system, and a control method thereof are provided. The apparatus includes: a first speaker unit for outputting a high band sound from a sound reproduced in the car audio system; a second speaker unit for outputting a middle band sound and a low band sound from the sound reproduced in the car audio system; a first structure for providing a directionality for the low band sound; and a second structure for rotating the first structure correspondingly to a position of a user of the car audio system.

1 Claim, 7 Drawing Sheets

APPARATUS FOR IMPROVING IMAGE IN CAR AUDIO SYSTEM, AND CONTROL METHOD THEREOF

BACKGROUND OF THE INVENTION

1. Field of the Invention

The present invention relates to a car audio system, and more particularly, to an apparatus for improving an image in a car audio system, and a control method thereof.

2. Description of the Related Art

In recent years, as a car is presumed to be an essential means, various devices for providing various conveniences to a driver (for example, a car audio system) in addition to devices indispensable for running the car (for example, an engine) are being actively researched and developed.

Particularly, a digital car audio system for opening and closing a car door and receiving a music file by a cellular phone to reproduce the received music file through an audio device has been recently developed. The digital car audio system uses a digital intermediate frequency (DIF) method and a Bluetooth method being a standard of a local area wireless communication. In comparison to a conventional analogous car audio system, the digital car audio system is excellent in its performance of radio wave reception and reduces to the minimum an unnecessary noise or a multi-path phenomenon where radio wave is reflected in a downtown building jungle, thereby providing the best sound quality.

However, even the digital car audio system reduces a sound stage due to a characteristic of a listening space, that is, a characteristic of a car listening space. Then, the reduction of the sound stage depending on the characteristic of the listening space of the car audio system will be in detail described as follows.

First, unlike a general listening space, the car is greatly limited in its listening space and therefore, is being varied little by little for a condition of golden triangle partition. This is because, in a comparison of a ratio of a direct sound to an indirect sound, an excessive direct sound causes a user of the car audio system to easily feel fatigue and dislike and an excessive indirect sound causes the user to easily feel tight in listening to all music.

In general, keeping a reverberation time suitable to the listening space functions as an important factor in order to listen to the music. Reverberation is determined depending on a ratio where a sound is reflected in the listening space. Generally, a characteristic of a sound having a long reverberation time is called “live”, and a characteristic of a sound having a short reverberation time is called “dead”. There is a drawback in that a sound image becomes unclear when the live characteristic is great, and a music listening atmosphere is destroyed when the dead characteristic is great.

However, due to narrowness of the listening space, a listener of the car audio system is directly exposed to a speaker in the listening space of the car, and an echo sound and a reflection sound are reduced in level due to car interior materials and seat. As a result, an oriented direction and an angle of the speaker function as the most important factors in determining the sound stage of the car audio system.

However, a rear speaker is not only fixed but also reproduces only middle and low band sound in the car audio system, and therefore it is difficult to consider the live and dead characteristics of the reverberation. Accordingly, it is difficult to embody an accurate image depending on a position of the user of the car audio system, thereby making it also difficult to embody a Dolby digital surround sound in the car audio system.

Then, a general sound direction depending on a speaker position of the car audio system will be described with reference to FIG. 1.

FIGS. 1*a* and 1*b* schematically illustrate the sound direction depending on the speaker position of the car audio system.

In general, the car audio system includes a front speaker and a rear speaker. The sound direction based on a straightness of the high band sound and a permeability of the low band sound depending on the front speakers and the rear speakers is illustrated in FIGS. 1*a* and 1*b*.

As aforementioned, the speakers of the car audio system are provided only at predetermined positions of a narrow car space and therefore, there is a drawback in that it is difficult to embody the accurate image depending on the user position, thereby deteriorating the sound stage.

SUMMARY OF THE INVENTION

Accordingly, the present invention is directed to an apparatus for improving an image in a car audio system and a control method thereof that substantially overcome one or more of the limitations and disadvantages of the conventional art.

One object of the present invention is to provide an apparatus for improving an image in a car audio system, and a control method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided an apparatus for improving an image in a car audio system, the apparatus including: a first speaker unit for outputting a high band sound from a sound reproduced in the car audio system; a second speaker unit for outputting a middle band sound and a low band sound from the sound reproduced in the car audio system; a first structure for providing a directionality for the low band sound; and a second structure for rotating the first structure correspondingly to a position of a user of the car audio system.

In another aspect of the present invention, there is provided a control method of an image improving apparatus of a car audio system having a first speaker unit for outputting a high band sound from a sound reproduced in the car audio system, and a second speaker unit for outputting a middle band sound and a low band sound from the sound reproduced in the car audio system, the method including the step of: adjusting a direction of the low band sound outputted from the second speaker unit, correspondingly to a position of a user of the car audio system.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s)

of the invention and together with the description serve to explain the principles of the invention. In the drawings.

DETAILED DESCRIPTION OF THE INVENTION

Figure 1A:
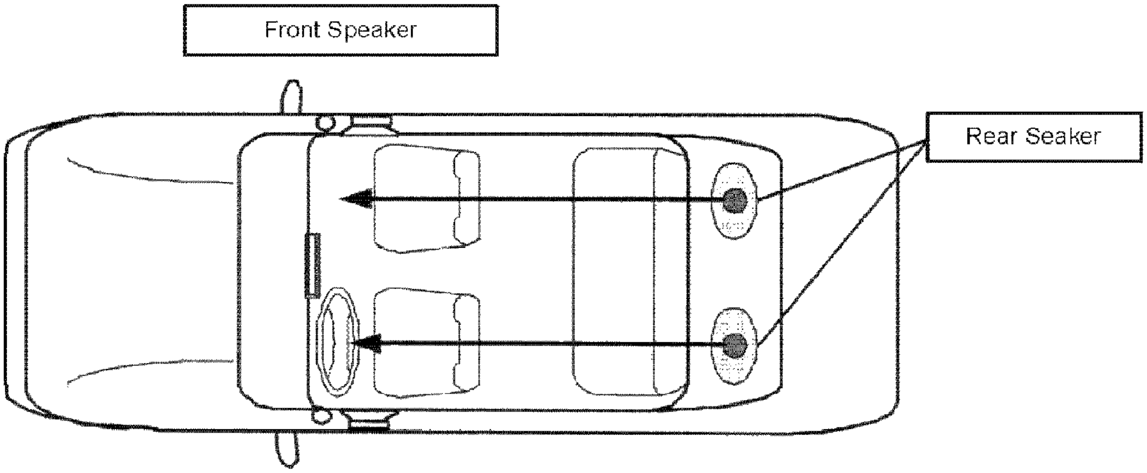
FIG. 1a PRIOR ART
FIGS. 1*a* and 1*b* schematically illustrates a conventional sound direction depending on a speaker position in a car audio system.
Figure 1B:
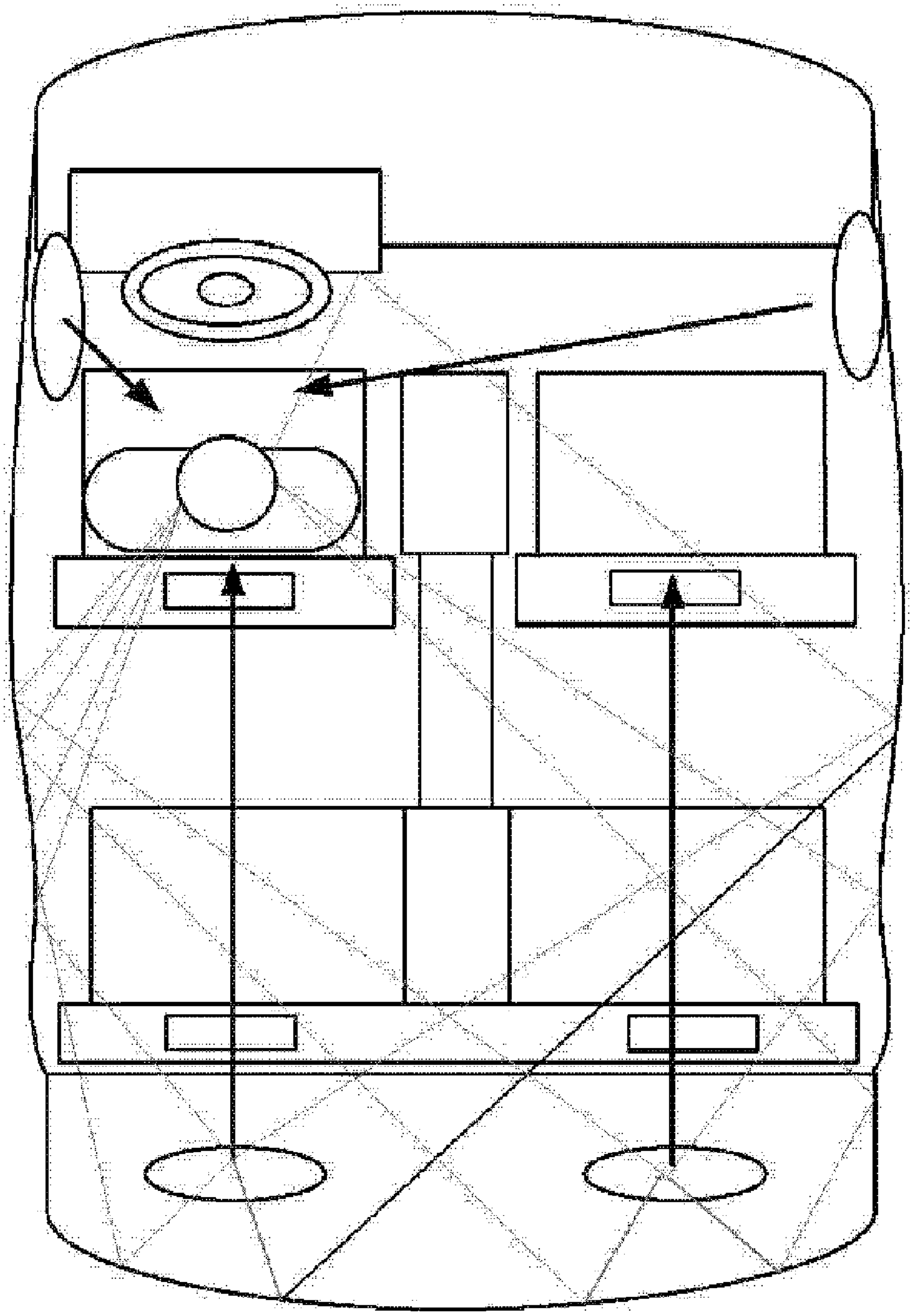
FIG. 1b PRIOR ART

Reference will now be made in detail to the preferred embodiments of the present invention, examples of which are illustrated in the accompanying drawings. Wherever possible, the same reference numerals will be used throughout the drawings to refer to the same or like parts.

The present invention provides an apparatus for improving an image in a car audio system, and a control method thereof. In particular, the present invention provides the apparatus in which a speaker is disposed in the car audio system in consideration of a characteristic of car space and a characteristic of sound, thereby improving the image, and the control method thereof.

Figure 2A:
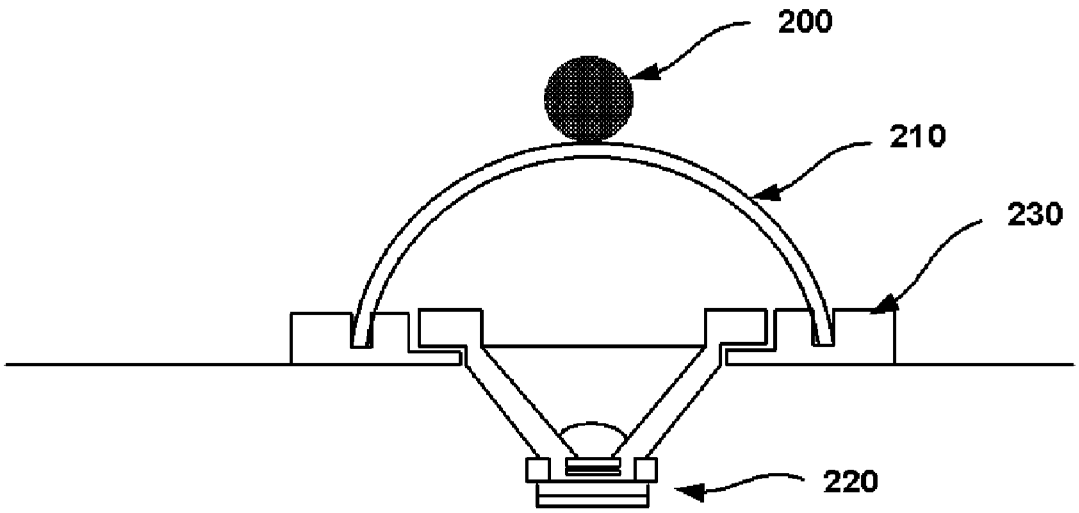
FIGS. 2*a* and 2*b* is a front view and a side view illustrating an apparatus for improving an image in a car audio system according to an embodiment of the present invention.
Figure 2B:
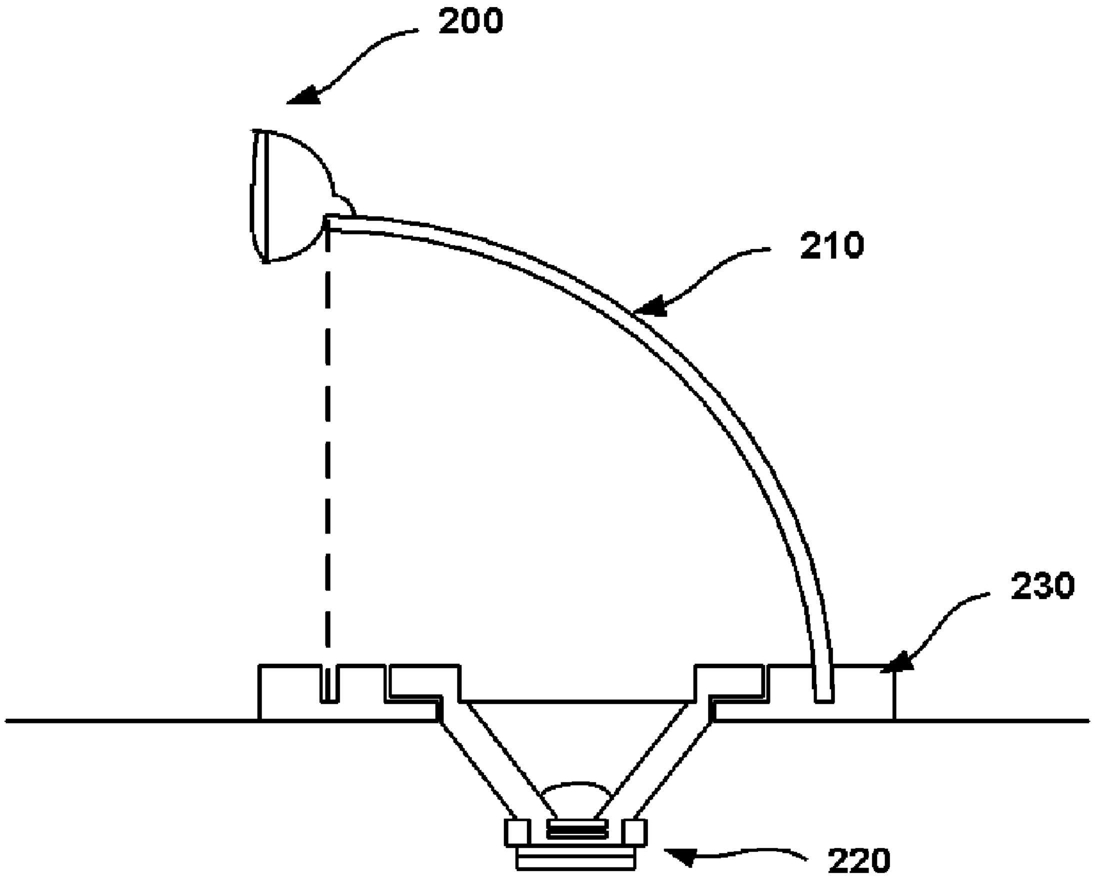

FIGS. 2*a* and 2*b* are a front view and a side view illustrating an apparatus for improving an image in a car audio system according to an embodiment of the present invention.

Prior to the description of FIGS. 2*a* and 2*b*, in a general car audio system, a rear speaker employs a speaker for reproducing a middle and low sound, and is embodied to face upward. In a structure of the rear speaker, it is impossible to reproduce a sound at all bands, and even though the sound is reproduced at all bands, it is impossible to embody an accurate image due to a sound distortion ratio. A low band sound is relatively good in permeability and is not directional, and as the sound grows high in band, it gets more directional and gets worse in permeability.

The present invention provides the image improving apparatus considering the aforementioned environment. In the image improving apparatus shown in FIGS. 2*a* and 2*b*, a reference numeral 200 denotes a speaker unit for outputting the high band sound, a reference numeral 210 denotes a hemisphere shaped structure for generating a directionality of the low band sound, a reference numeral 220 denotes a speaker unit for outputting the middle and low sound, a reference numeral 230 denotes a structure for rotating the hemisphere shaped structure 210.

In FIGS. 2*a* and 2*b*, the structure of the inventive image improving apparatus of the car audio system is described as above. Next, an operation of the image improving apparatus of FIGS. 2*a* and 2*b* will be described with reference to FIG. 3.

Figure 3:
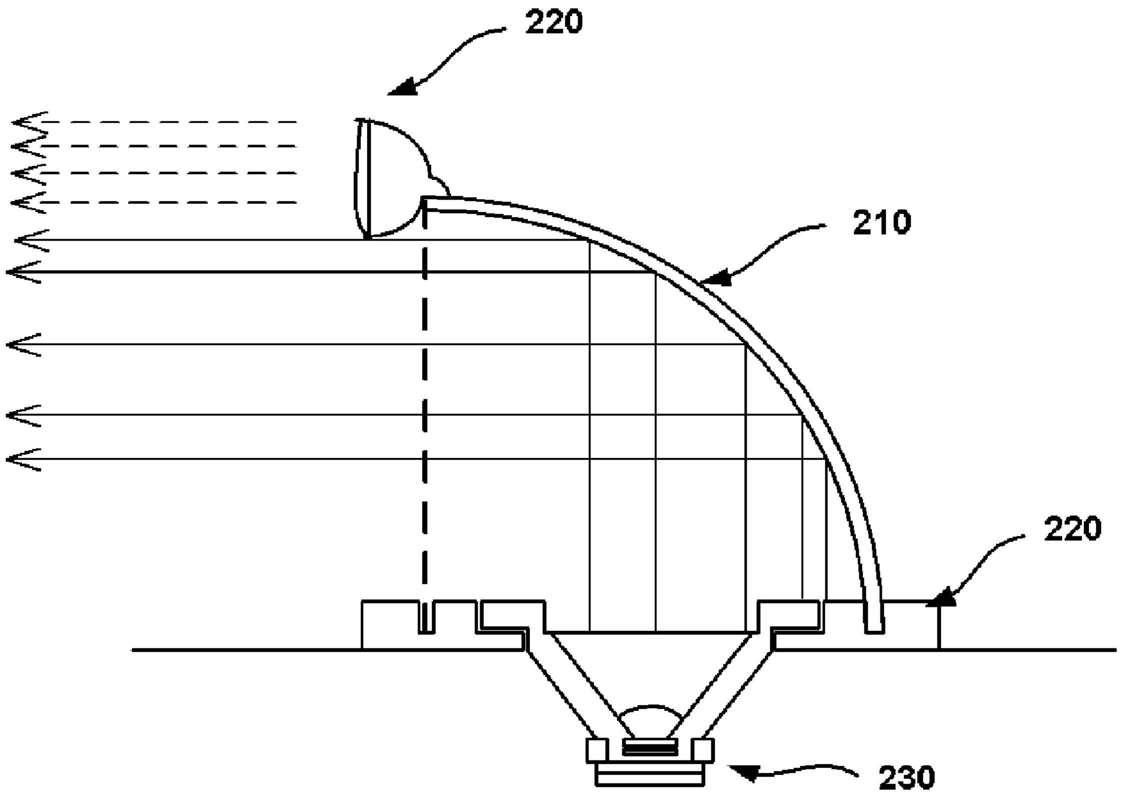
FIG. 3 schematically illustrates an operation of the image improving apparatus of FIGS. 2*a* and 2*b;*

FIG. 3 schematically illustrates the operation of the image improving apparatus of FIGS. 2*a* and 2*b*.

Referring to FIG. 3, the speaker unit 200 outputs the high band sound from the reproduced sound, and the speaker unit 220 outputs a middle band sound and the low band sound from the reproduced sound. Meantime, the middle band sound and the low band sound are outputted from the speaker unit, and travel toward a user of the car audio system owing to the hemisphere shaped structure 210. The structure 230 adjusts the hemisphere shaped structure 210 in direction so that the hemisphere shaped structure 210 enables the speaker unit 220 to output the middle band sound and the low band sound toward the user of the car audio system.

In FIG. 3, the operation of the image improving apparatus of FIGS. 2*a* and 2*b* is described as above. Next, direction adjustment of the hemisphere structure 210 depending on a position of the user of the car audio system will be described with reference to FIG. 4.

Figure 4:
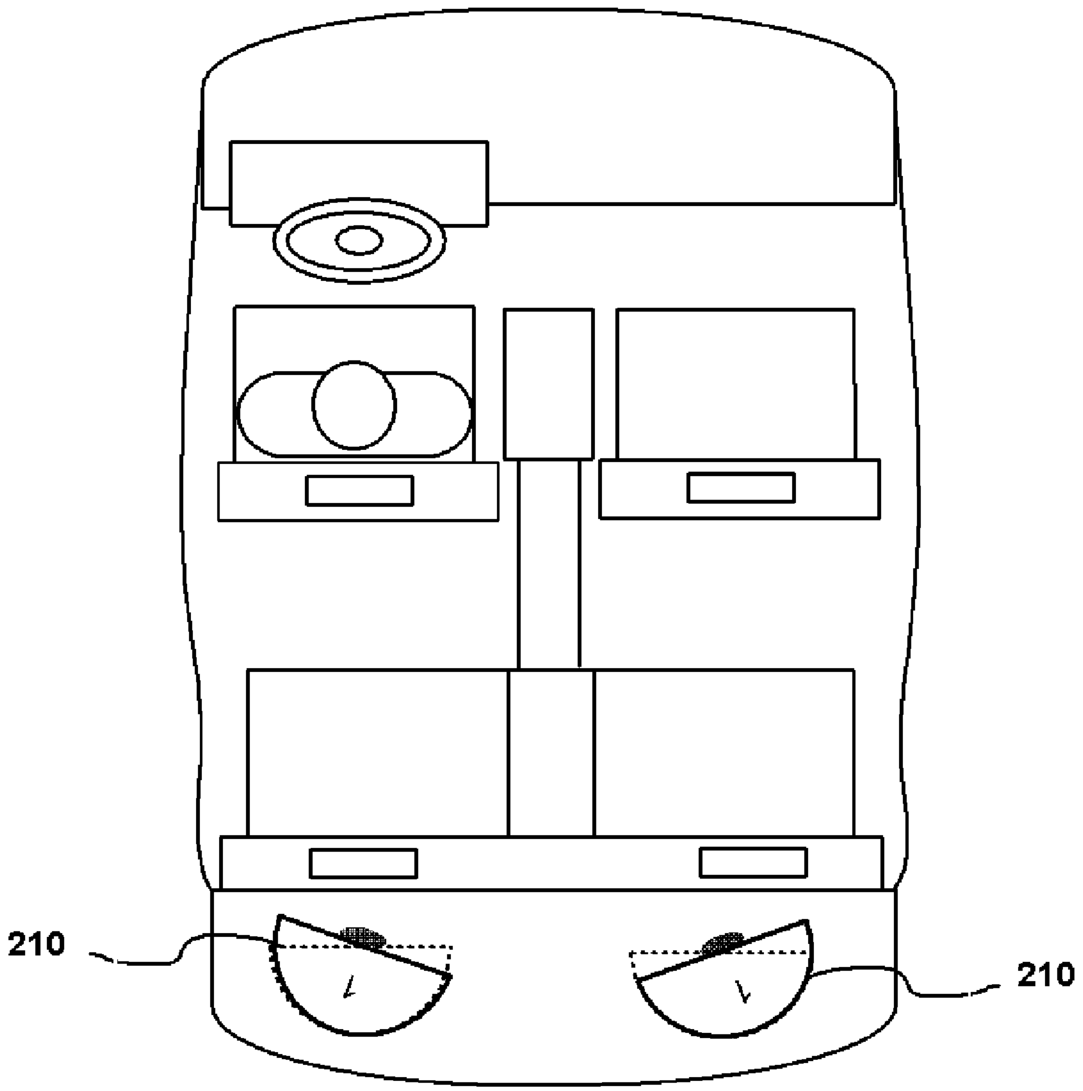
FIG. 4 illustrates a state where a hemisphere shaped structure of the image improving apparatus is adjusted in direction depending on a user position in a car audio system.

FIG. 4 illustrates a state where the hemisphere shaped structure 210 of the image improving apparatus of FIGS. 2*a* and 2*b* is adjusted in direction depending on the position of the user of the car audio system.

As shown in FIG. 4, the user of the car audio system is positioned at a driver's seat and therefore, the hemisphere structure 210 of the image improving apparatus is adjusted in direction toward the user of the car audio system positioned at the driver's seat.

In FIG. 4, the direction adjustment of the hemisphere shaped structure 210 depending on the position of the user of the car audio system is described as above. Next, a sound direction when the hemisphere shaped structure 210 is adjusted in direction depending on the position of the user of the car audio system as in FIG. 4 will be described with reference to FIG. 5.

Figure 5:
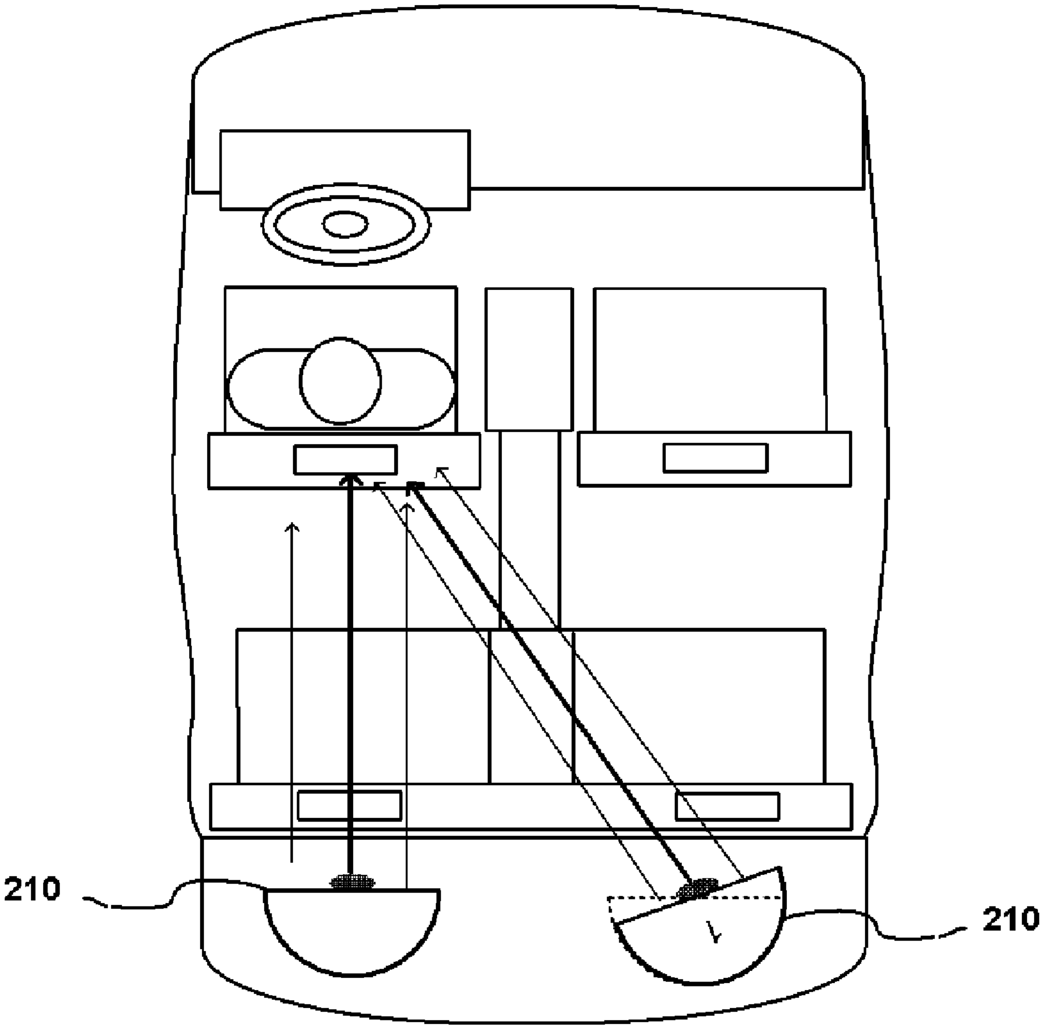
FIG. 5 schematically illustrates a sound direction when a hemisphere shaped structure is adjusted in direction depending on a user position in the car audio system of FIG. 4.

FIG. 5 schematically illustrates the sound direction when the hemisphere shaped structure 210 is adjusted in direction depending on the position of the user of the car audio system of FIG. 4.

Referring to FIG. 5, since the hemisphere shaped structure 210 is adjusted in direction toward the driver positioning seat as described in FIG. 4, the sound is generated and travels toward the car driver's seat. In other words, the image can be accurately embodied toward the driver' seat in the car space.

As described above, the present invention has an advantage in that the speaker is adjusted in direction depending on the user position in the car audio system, thereby adjusting the sound direction depending on the user position and embodying the accurate image.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. An apparatus for improving an image in a car audio system, the apparatus comprising:

a first speaker unit for outputting a high band sound from a sound reproduced in the car audio system;

a second speaker unit for outputting a middle band sound and a low band sound from the sound reproduced in the car audio system, wherein the second speaker unit is installed to face upward fixedly on a horizontal plane;

a first structure for providing a directionality for the low band sound, wherein the first structure has a shape of a half-cut of hemisphere completely covering the second speaker so as to reflect the sound from the second speaker and change the direction of sound by 90 degrees, and wherein the directionality is given by the direction of the reflected sound; and a second structure for rotating the first structure on the horizontal plane correspondingly to a position of a user of the car audio system, such that the first structure rotates with the second speaker as a center of rotation, wherein the first speaker is disposed at a top portion of the first structure so as to point in a direction of the directionality for the low band sound.

* * * * *